US011683465B2

(12) United States Patent
Heidemann et al.

(10) Patent No.: US 11,683,465 B2
(45) Date of Patent: Jun. 20, 2023

(54) STEREO ILLUMINATION

(71) Applicant: FARO Technologies, Inc., Lake Mary, FL (US)

(72) Inventors: Rolf Heidemann, Stuttgart (DE); Matthias Wolke, Korntal-Münchingen (DE); Christoph Neundorf, Langewiesen (DE)

(73) Assignee: FARO Technologies, Inc., Lake Mary, FL (US)

( * ) Notice: Subject to any disclaimer, the term of this patent is extended or adjusted under 35 U.S.C. 154(b) by 70 days.

(21) Appl. No.: 16/747,200

(22) Filed: Jan. 20, 2020

(65) Prior Publication Data

US 2020/0314409 A1    Oct. 1, 2020

Related U.S. Application Data

(60) Provisional application No. 62/825,145, filed on Mar. 28, 2019.

(51) Int. Cl.
*H04N 13/239* (2018.01)
*H04N 13/254* (2018.01)
*H04N 23/74* (2023.01)

(52) U.S. Cl.
CPC ......... *H04N 13/239* (2018.05); *H04N 13/254* (2018.05); *H04N 23/74* (2023.01)

(58) Field of Classification Search
CPC .. H04N 13/239; H04N 13/254; H04N 5/2256; H04N 5/2354; H04N 13/246; H04N 23/56; H04N 23/74
USPC ............................................................. 348/47
See application file for complete search history.

(56) References Cited

U.S. PATENT DOCUMENTS

| | | | |
|---|---|---|---|
| 2015/0021228 A1* | 1/2015 | Su | A61B 50/31 206/570 |
| 2017/0155852 A1* | 6/2017 | von Cramon | H04N 5/2256 |
| 2017/0186183 A1 | 6/2017 | Armstrong et al. | |
| 2018/0321383 A1 | 11/2018 | Heidemann et al. | |
| 2019/0289280 A1* | 9/2019 | Yeh | H04N 13/271 |

* cited by examiner

*Primary Examiner* — Christopher S Kelley
*Assistant Examiner* — Ana Picon-Feliciano
(74) *Attorney, Agent, or Firm* — McCarter & English, LLP; Dave S. Christensen; David K. Kincaid

(57) ABSTRACT

An imaging device and method of imaging a region. The imaging device includes a first camera and a first light source set at a periphery of the first camera, a second camera separated from the first camera by a selected distance and a second light source set at a periphery of the second camera, and a processor configured to operate the first light source set and the second light source set independently of each other. The region is illuminated using the first light source and a first image is obtained. The region is illuminated using the second light source and a second image is obtained. At least one of the first image and the second image includes an illumination effect.

17 Claims, 17 Drawing Sheets

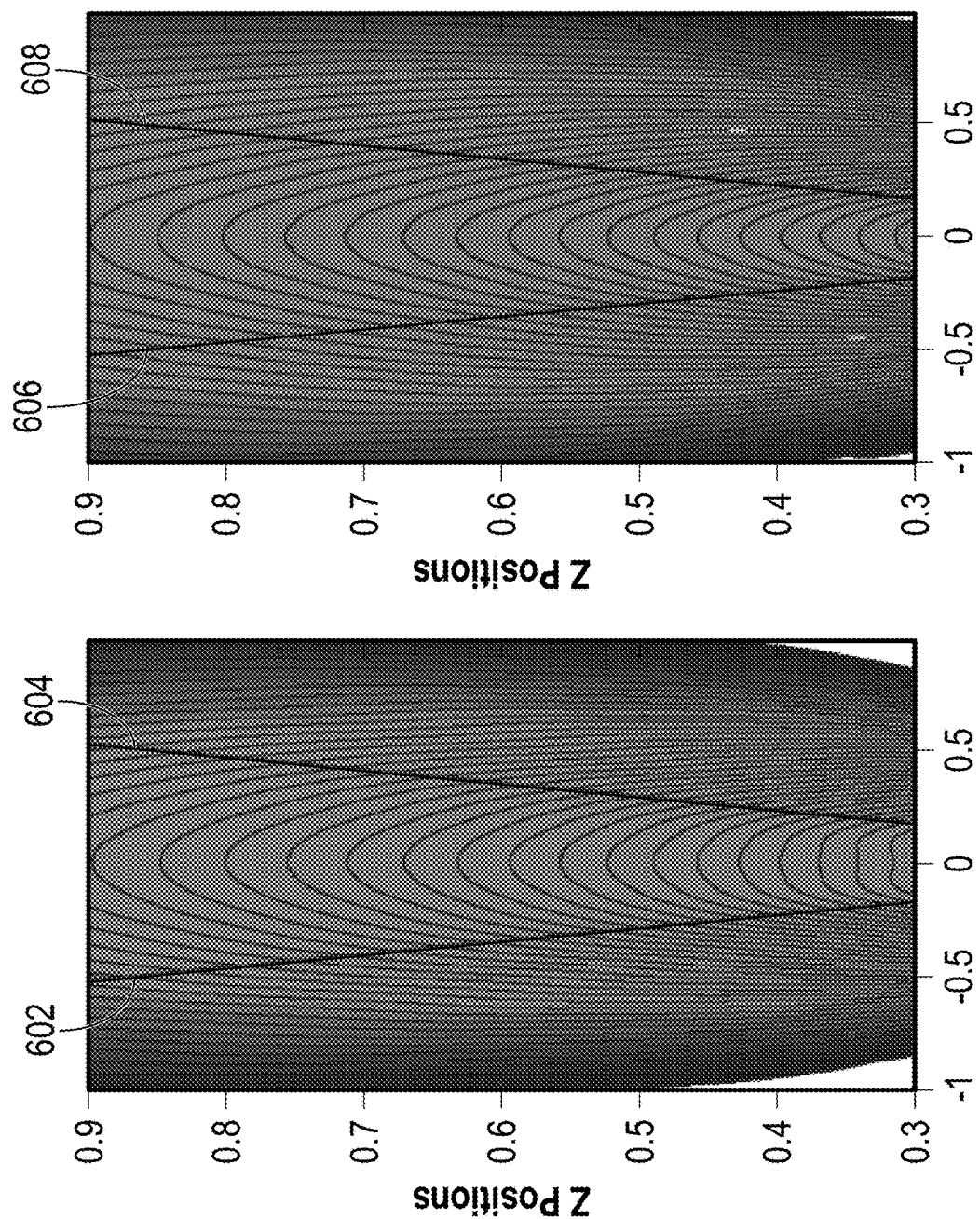

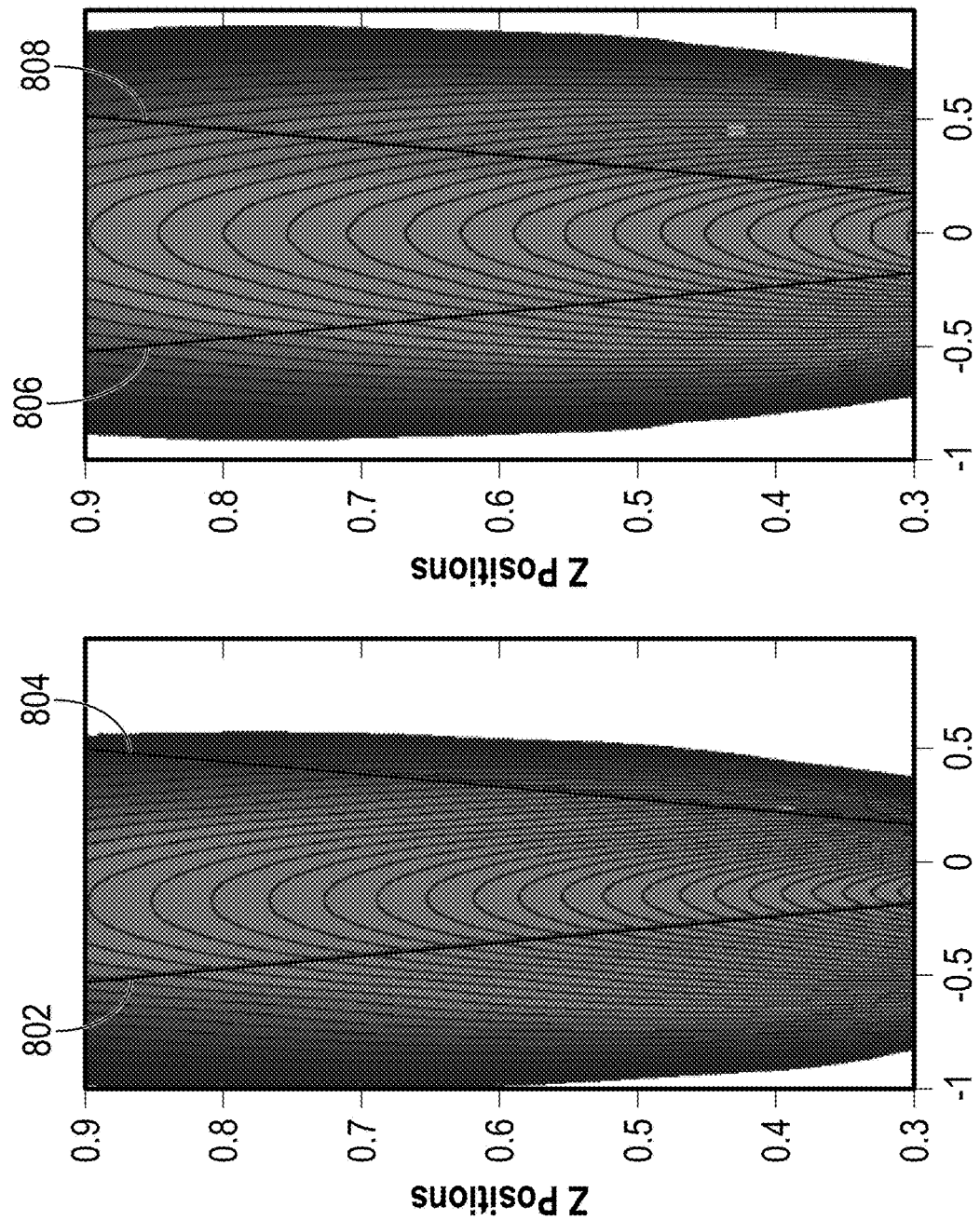

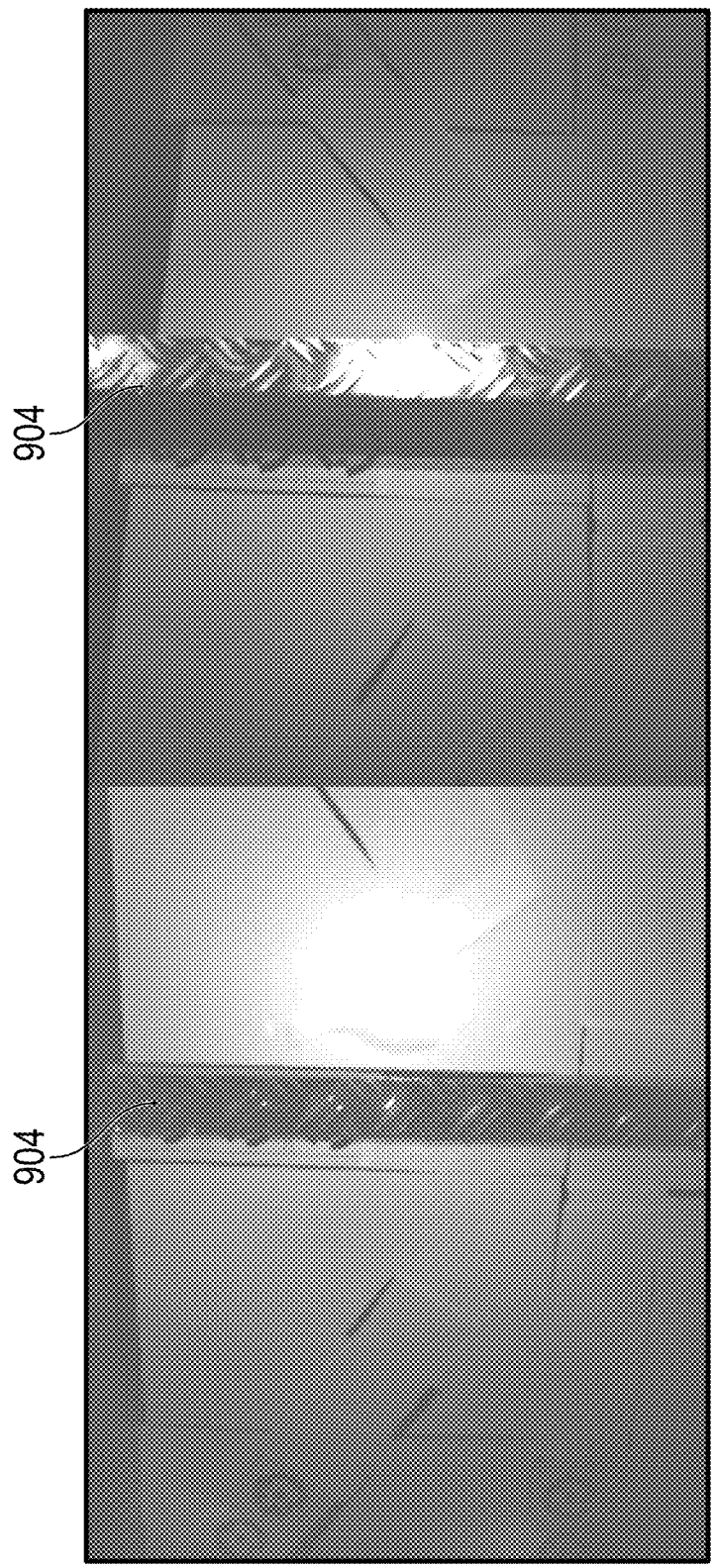

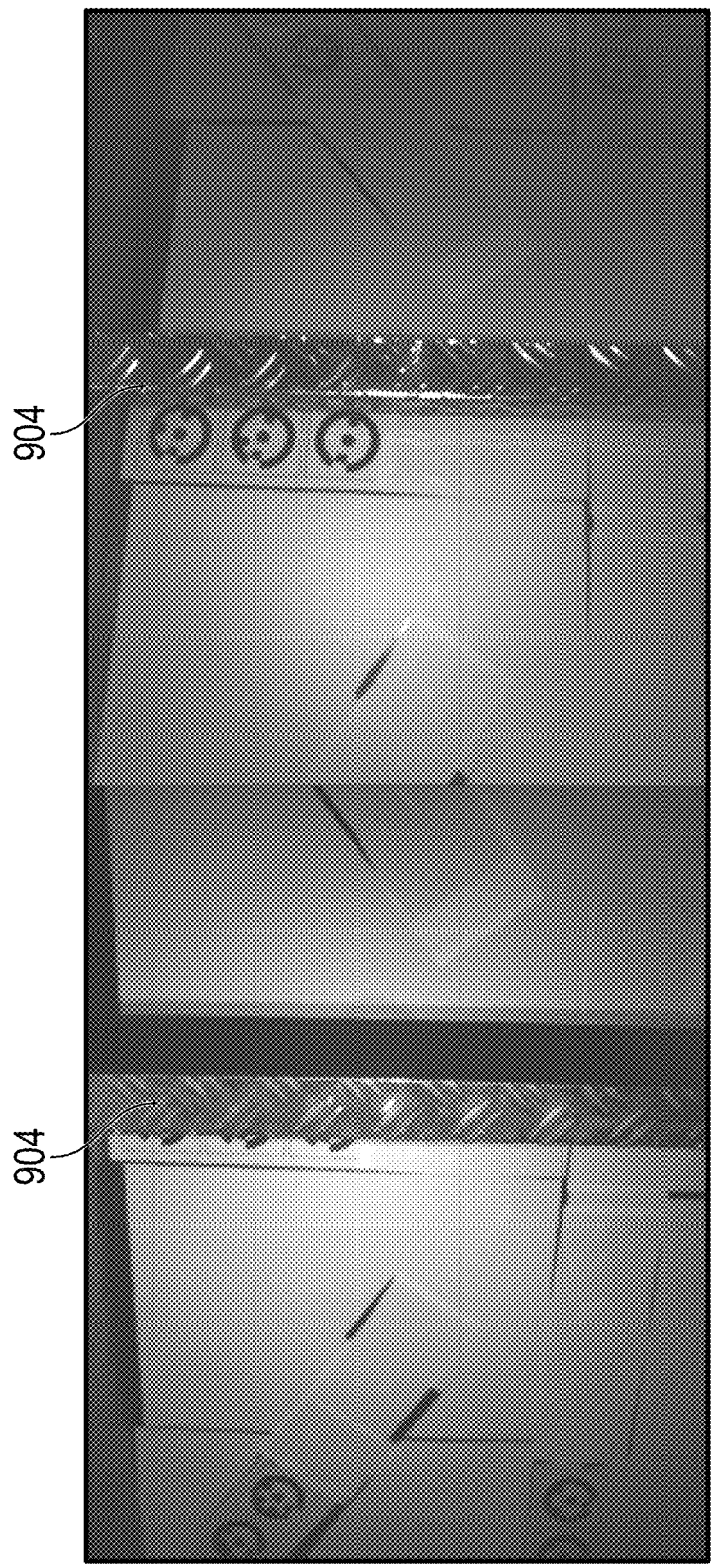

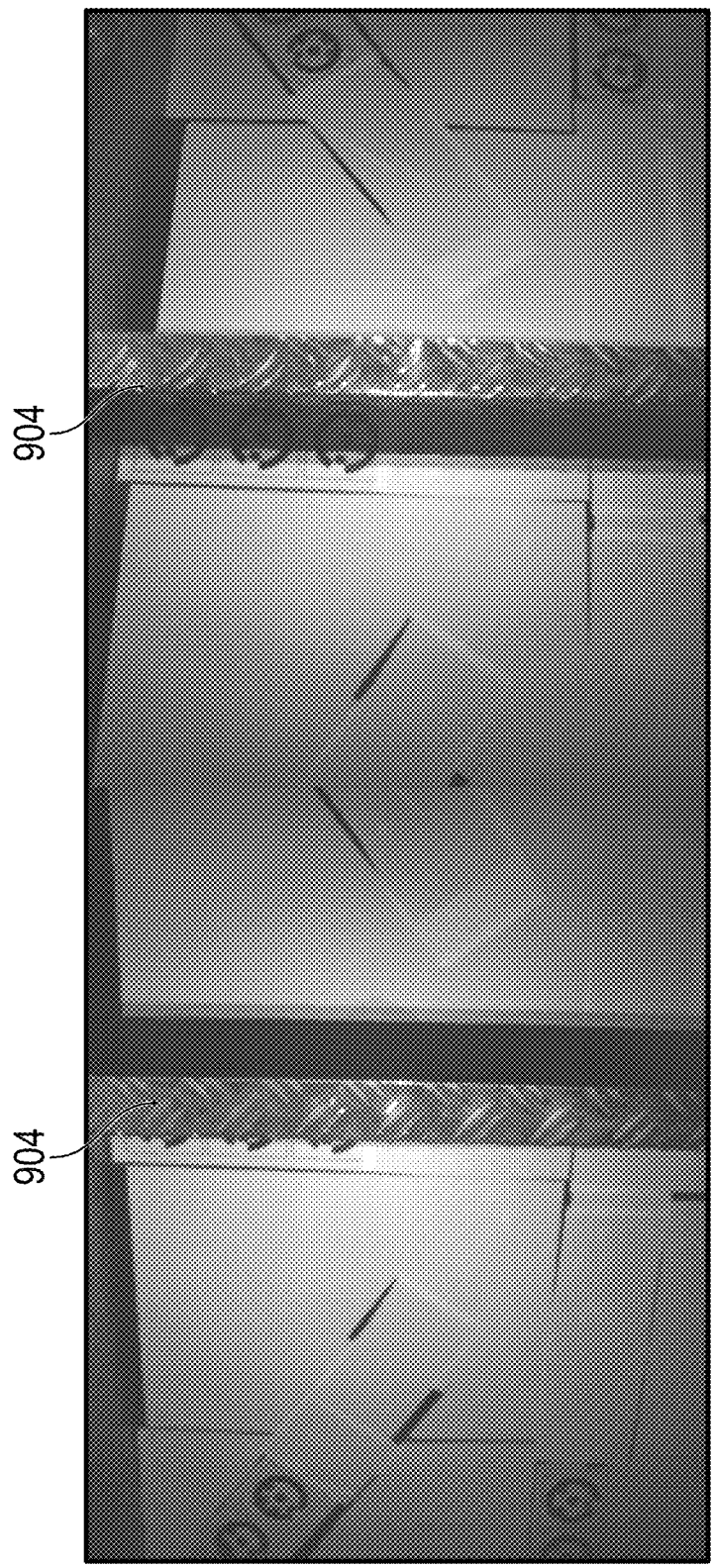

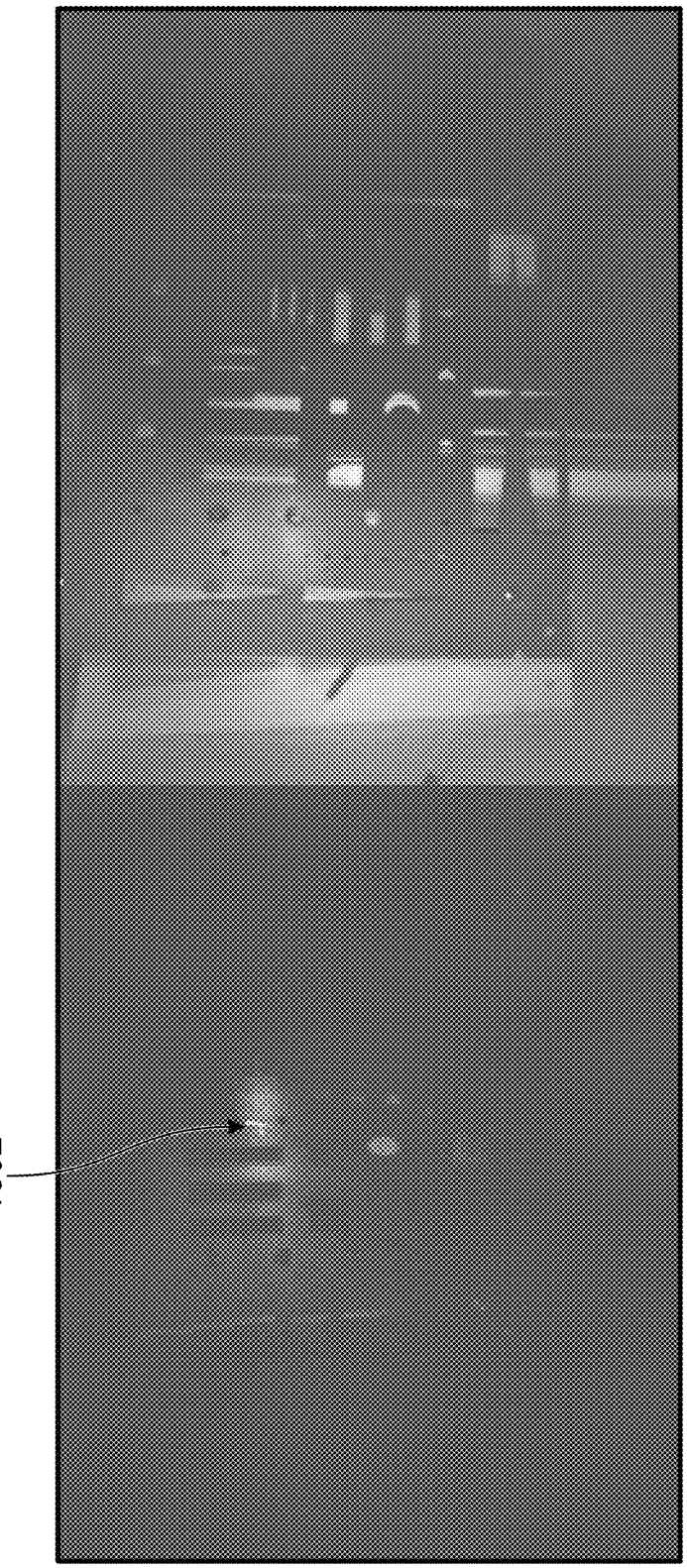

STEREO ILLUMINATION

CROSS REFERENCE TO RELATED APPLICATIONS

This application is a Non-Provisional application which claims the benefit of U.S. Provisional Application No. 62/825,145 filed Mar. 28, 2019, which is incorporated by reference in its entirety herein.

BACKGROUND

The subject matter disclosed herein relates to imaging devices and, in particular, to systems and methods for stereo illumination of a region that is to be captured by an imaging device.

Stereoscopic imaging devices include at least two cameras separated from each other by a baseline in order to capture various images. Lighting for such systems can be difficult, as a lighting arrangement that is beneficial for one of the cameras can, due to the differences in their location and orientation, causing glare or shadows at the other cameras. Accordingly, there is a need for lighting systems for a stereoscopic imaging device that can be operated to the benefit of each camera of the imaging device.

BRIEF DESCRIPTION

According to one aspect of the invention, an imaging device is provided. The imaging device includes a first camera, a first light source set at a periphery of the first camera for illuminating a region, a second camera separated from the first camera by a selected distance, a second light source set at a periphery of the second camera for illuminating the region, and a processor configured to operate the first light source set and the second light source set independently of each other to illuminate the region.

According to another aspect of the invention, a method of imaging a region is provided. The method includes: illuminating the region using a first light source set at a periphery of a first camera of an imaging device, obtaining a first image, illuminating the region using a second light source set at a periphery of a second camera of the imaging device, and obtaining a second image, wherein at least one of the first image and the second image includes an illumination effect.

These and other advantages and features will become more apparent from the following description taken in conjunction with the drawings.

BRIEF DESCRIPTION OF THE DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

FIGS. 6A and 6B shows calculated light distributions for a region in the positive z-direction for the imaging device;

FIGS. 8A and 8B show calculated light distribution where only the left set of light sources is active;

FIGS. 10A and 10B show the same scenery as in FIGS. 9A and 9B, respectively, with illumination only by the second set of light sources;

FIGS. 11A and 11B show the same scenery as in FIGS. 9A and 9B, respectively with illumination only by the first set of light sources;

FIGS. 12A and 12B show a combination of the images of FIGS. 10A and 11A and FIGS. 10B and 11B, respectively;

FIGS. 14A and 14B show processed images of FIGS. 13A and 13B for left and right cameras, respectively;

The detailed description explains embodiments of the invention, together with advantages and features, by way of example with reference to the drawings.

DETAILED DESCRIPTION

Embodiments of the present invention provide advantages in enabling stereo imaging of a region or object in a region. An illumination or light system associated with an imaging device provides stereo or mono illumination capabilities. Such illumination can be used to reduce or enhance illumination direction-dependent imaging effects, such as glare, shadows, retro-reflection, etc., by appropriate imaging processing. In general, each camera has an associated set of light sources. The light sources are non-planar and non-axisymmetric with respect to their associated cameras. A first image can be obtained while the region is illuminated via a first set of light sources (also referred to herein as "first light source set") and as second image can be obtained while the region is illuminated via a second set of light sources (also referred to herein as "second light source set"). Differences between the first and second images can be used to remove glare or other imaging issues.

Figure 1A:
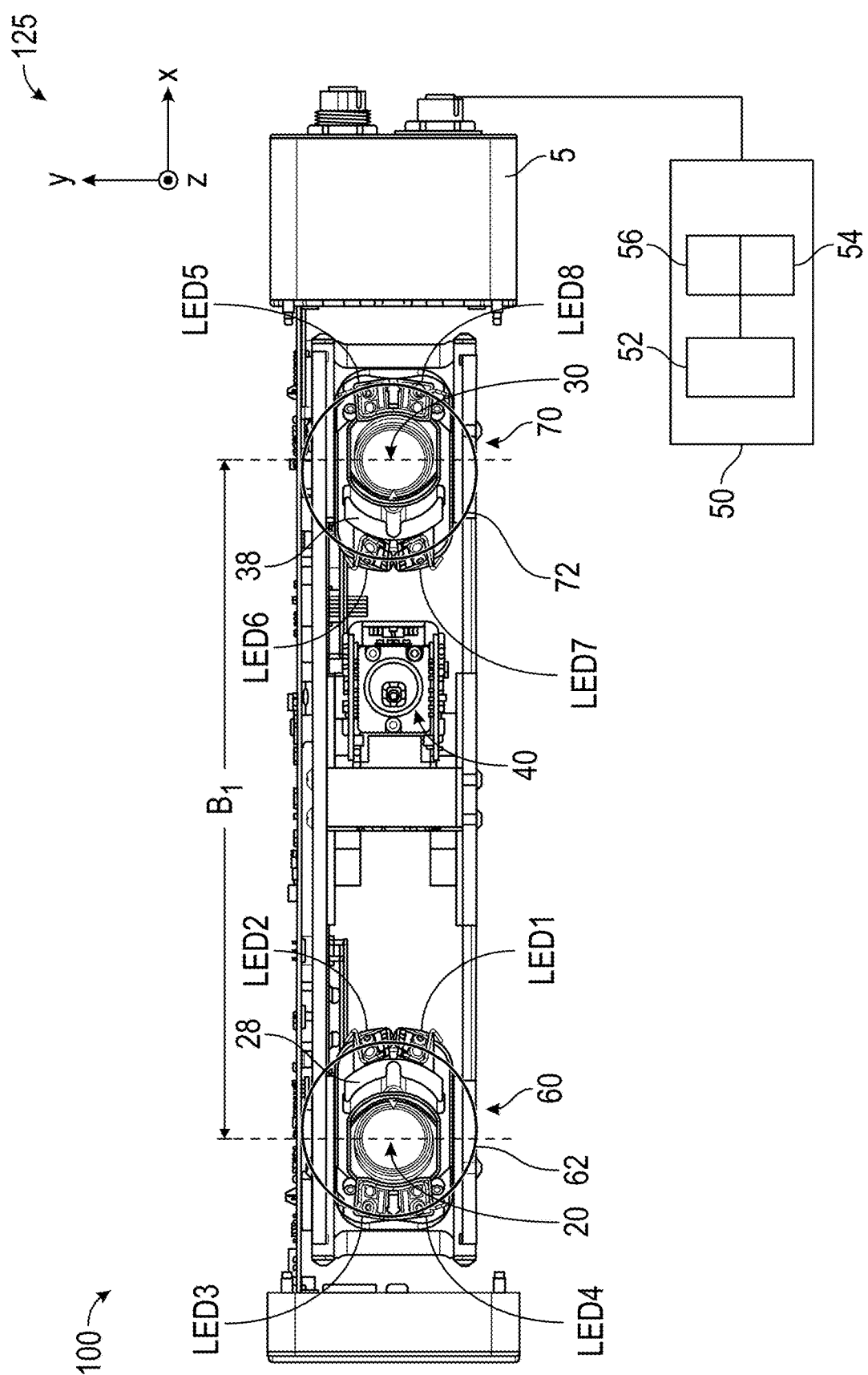
FIG. 1A shows a frontal view of an imaging device of the present invention in an embodiment.

FIG. 1A shows a frontal view of an imaging device 100 of the present invention in an embodiment. In various embodiments, the imaging device 100 can be a triangulation scanner. The imaging device 100 includes a body 5, a first camera 20 and a second camera 30. The imaging device 100 can further include a projector 40 for projecting structured light patterns into a region. The first camera 20 and second camera 30 are separated by a baseline having a separation distance $B_1$. A coordinate system 125 for the imaging device 100 is shown of illustrative purposes. The baseline is parallel to an x-axis of a coordinate system 125.

Figure 1B:
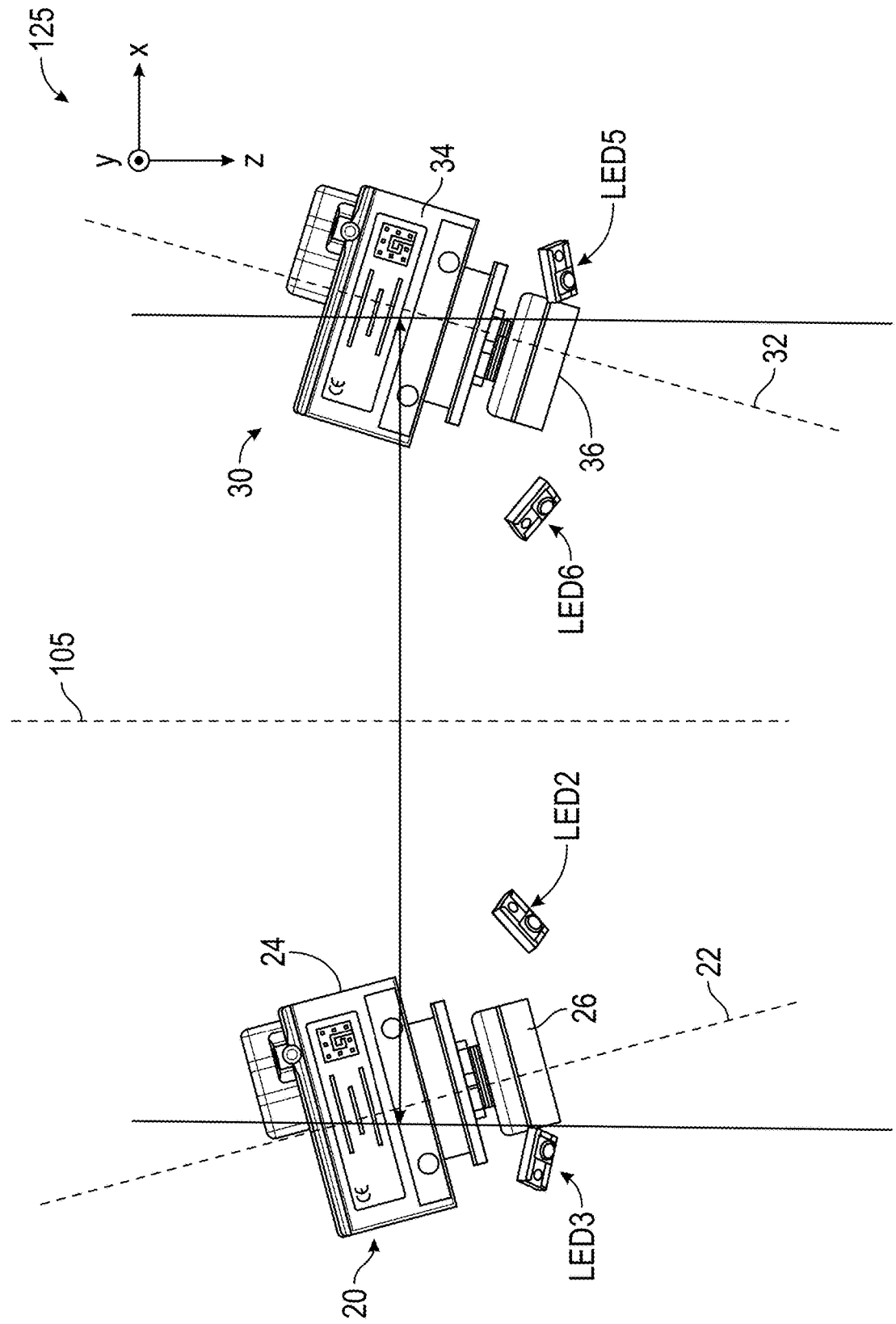
FIG. 1B shows a top view of the imaging device of FIG. 1A.

FIG. 1B shows a top view of the imaging device 100 of FIG. 1A. As shown in FIG. 1B, a first-camera optical axis 22 of the first camera 20, and a second-camera optical axis 32 of the second camera 30 lie on a common plane (i.e., plane x-z). The first optical axis 22 and the second optical axis 32 are generally unaligned with the z-axis of the imaging device 100. In some embodiments, an optical axis 105 of the imaging device 100 passes through a center of symmetry of the imaging device 100, for example. The first camera 20 includes a first-camera body 24 and a first-camera lens 26. The first camera 20 further includes a photosensitive array and camera electronics (not shown). The second camera 30 includes a second-camera body 34 and a second-camera lens 36. The second camera 30 further includes a photosensitive array, and camera electronics (not shown).

Referring to FIG. 1A, the imaging device 100 includes a control unit 50. The control unit includes a processor 52 and a memory storage device 54 having programs stored therein that when accessed by the processor 52 enable the processor to perform various operations for controlling operations of the imaging device 100 and its components as well as for image processing of various images captured at least one of the first camera 20 and the second camera 30. The control unit 50 can further control operation of the projector 40 and can determine 3D coordinates of points projected onto an object by the projector 40. The control unit 50 can be included inside the body 5 or may be external to the body 5. In further embodiments, more than one processor can be used. In an embodiment, the imaging device 100 may determine the 3D coordinates in a similar manner to that described in commonly owned United States Patent Application 2017/0186183, which is incorporated by reference herein.

The imaging device 100 further includes a stereo illumination system that includes a first set 60 of light sources associated with the first camera 20 and a second set 70 of light sources associated with the second camera 30. The light sources of the first set 60 and the light sources of the second set 70 can be light-emitting diodes in various embodiments. In various embodiments, the first set of light sources is a single light source and the second set of light sources is a single light source. In various embodiments, the first set of light sources is a single ring of light, such as an LED ring of light, and/or the second set of light sources is a single LED ring of light, such as an LED ring of light. The first set 60 of light sources are located along a periphery or ring 62 that is concentric with a central or optical axis of the first camera 20. In other words, each of the light sources in the first set 60 is located at the same position radially outward from the central axis of first camera 20. Similarly, the second set 70 of light sources are located along a periphery or ring 72 concentric with a central axis of the second camera 30. Each light source is oriented to project light rays along selected directions. In various embodiments, the orientation of the light rays are non-parallel to the z-axis of the coordinate system 125. In one embodiment, the first set 60 of light sources includes four light sources (LED 1, LED 2, LED 3, LED 4) and the second set 70 of light sources includes four light sources (LED 5, LED 6, LED 7, LED 8). In alternate embodiments, each of the first set 60 and the second set 70 includes at least two light sources.

The light sources are coupled to the control unit 50. The control unit 50 can control the times at which the light sources are turned on and off as well as the illumination levels of each light source. In various embodiments, the control unit operates the first set of light sources separately from the second set of light sources, for example, to control stereo and/or mono lighting of a region.

As shown in FIG. 1A, the light sources 60 associated with the first camera 20 are labelled LED 1, LED 2, LED 3, and LED 4. LED 1 is located in a bottom right corner of the first camera 20 as viewed from the frontal view (FIG. 1A) of the imaging device 100. Further in respect to the first camera 20, LED 2 is located in a top right corner, LED 3 is located in a top left corner and LED 4 is located in a bottom left corner.

The light sources of the second camera 30 are labelled LED 5, LED 6, LED 7, and LED 8. LED 5 is located in a top right corner of the second camera 30 as viewed from the frontal view of the imaging device 100. Further in respect to the second camera 30, LED 6 is located in a top left corner, LED 7 is located in a bottom left corner and LED 8 is located in a bottom right corner. The particular method of numbering the light sources shown herein are for exemplary purposes and the claims should not be so limited. It is contemplated that in other embodiments, the positions of the light sources with respect to the cameras 20, 30 may be different.

In an embodiment, the arrangement of the first set 60 of light sources is a mirror image of the arrangement of the second set 70 of light sources about the optical axis 105 (FIG. 1B). The top LEDS (i.e., LED 2, LED 3, LED 5 and LED 6) are generally a same distance above the base line and the lower LEDS (i.e., LED 1, LED 4, LED 7 and LED 8) are generally as same distance below the baseline. In other words, the LED pairs are equidistant from the baseline.

FIG. 1B shows the LEDs of the first camera 20 and second camera 30 from a top view. LED 2 and LED 3 are shown with respect to the first camera 20, whereas LED 1 and LED 4 are behind LED 2 and LED 3, respectively, and are therefore not visible in FIG. 1B. Similarly, LED 5 and LED 6 are shown with respect to the second camera 30, whereas LED 8 and LED 7 are behind LED 5 and LED 6, respectively, and are therefore not visible in FIG. 1B.

Figure 1C:
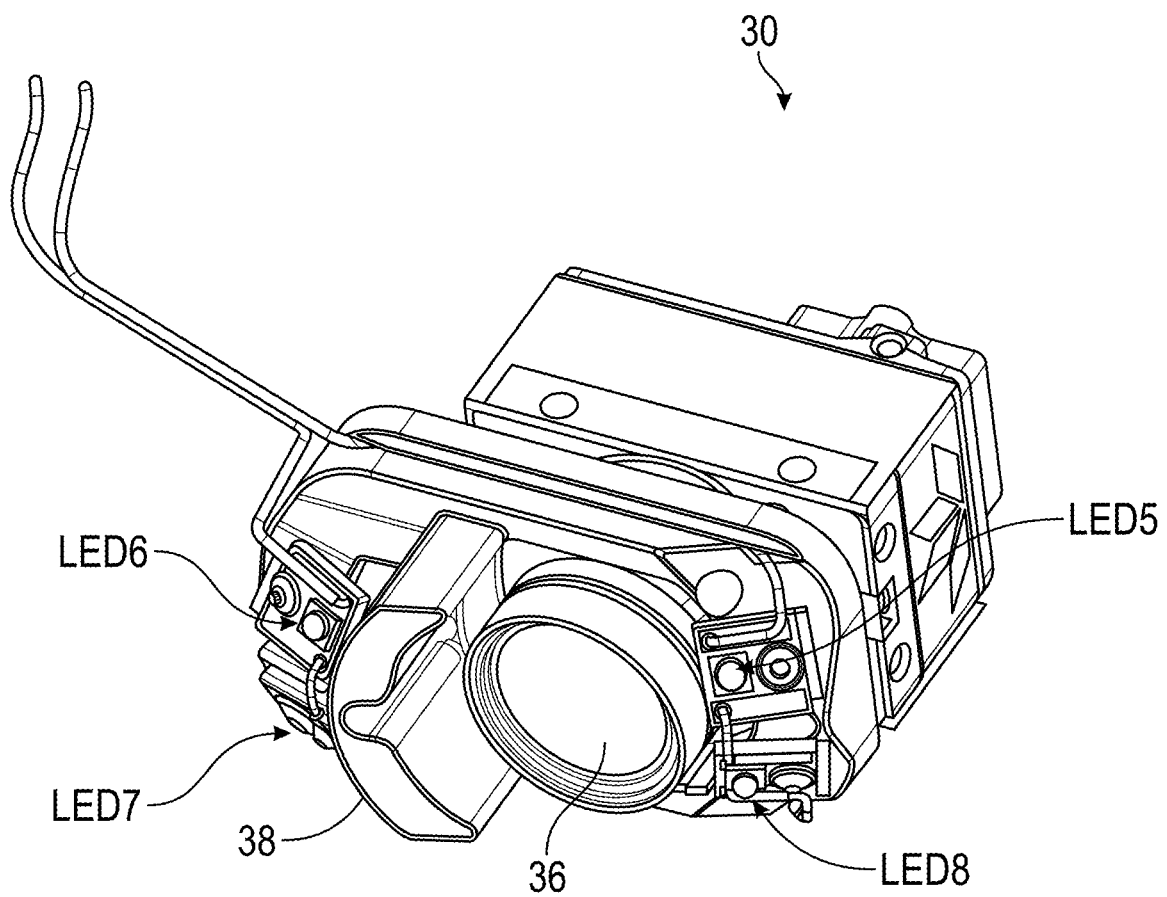
FIG. 1C shows a perspective view of the second camera of the imaging device of FIG. 1A showing a light barrier proximate to a lens of the second camera.

FIG. 1C shows a perspective view of the second camera 30 of the imaging device 100 showing a light barrier 38 proximate to a lens of the second camera. In an embodiment, the light barrier 38 projects outward (e.g. parallel to the axis 105) from the front of the imaging device 100. The light barrier 38 is located between the first camera 20 and the second camera 30 and next to the lens 36 of the second camera 38. In various embodiments, the light barrier 38 is between the lens of the second camera 30 and the inward-located LEDS of the second camera (i.e., LED 6 and LED 7). First camera 20 has a light barrier 28 (shown in FIG. 1A) similar to the light barrier 38 shown in FIG. 1C and located between its lens and tis inward-located LEDS. (i.e., LED 1 and LED 2).

The light barrier 38 prevent portions of light from LED 6 and LED 7 from entering the lens 36. In front of each camera, there is a flat glass window (not shown) that is coated with anti-reflection layers on both sides, to reduce reflected light from LED 6 and LED 7 from entering the cameras. However, without the light barrier 38, there remains some portion of light which is reflected directly from the LEDs into the lens. This reflection is visible as bright spots in an image. Due to the geometry of the setup, only the inner LEDs (i.e., LED 1, LED 2 for lens 20 and LED 6, LED 7 for lens 30) are directly reflected into the cameras. The light barrier 38 is therefore used to block a direct path of light from these LEDs into their respective associated cameras. Because only a part of the opening angle of the outward-pointing LEDs is blocked, the barrier 38 has minimal influence on the illumination of the field-of-view of the camera.

Figure 2:
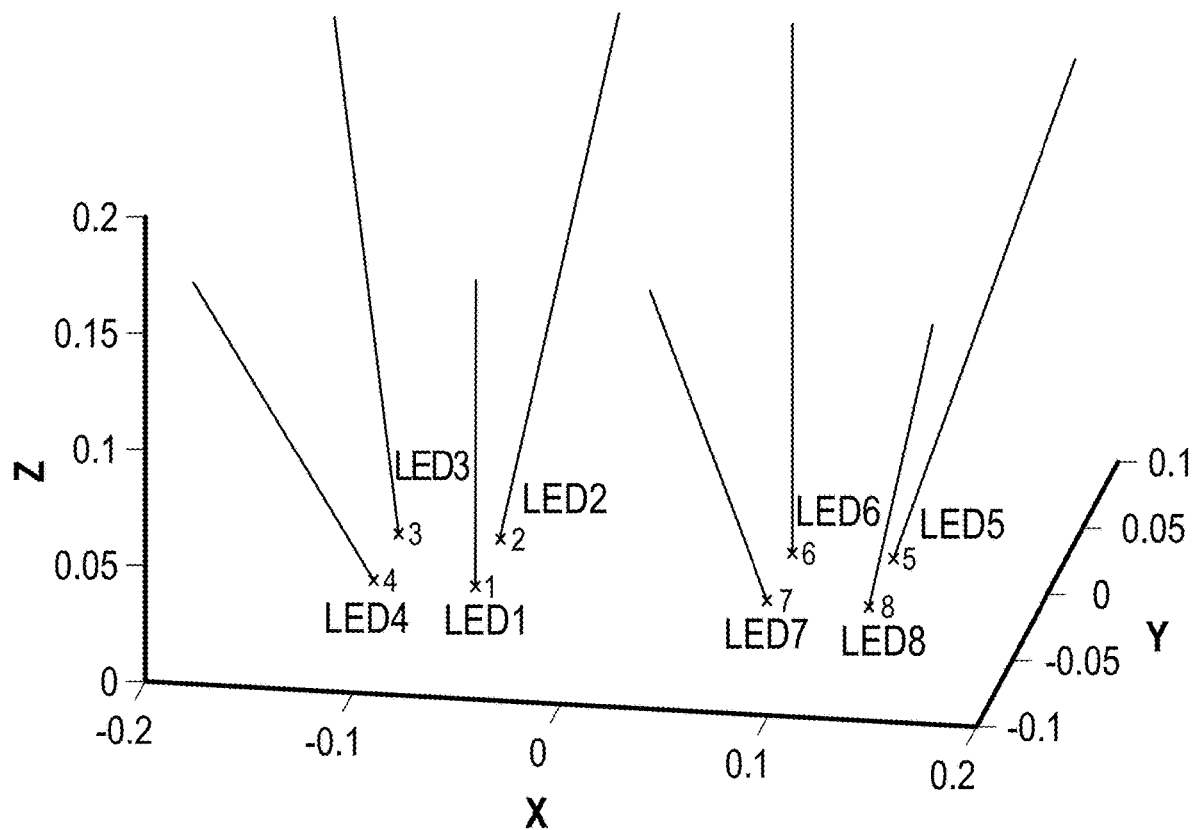
FIG. 2 illustrates a light ray diagram indicating a direction of light ray propagation from LEDs of the imaging device.
Figure 3:
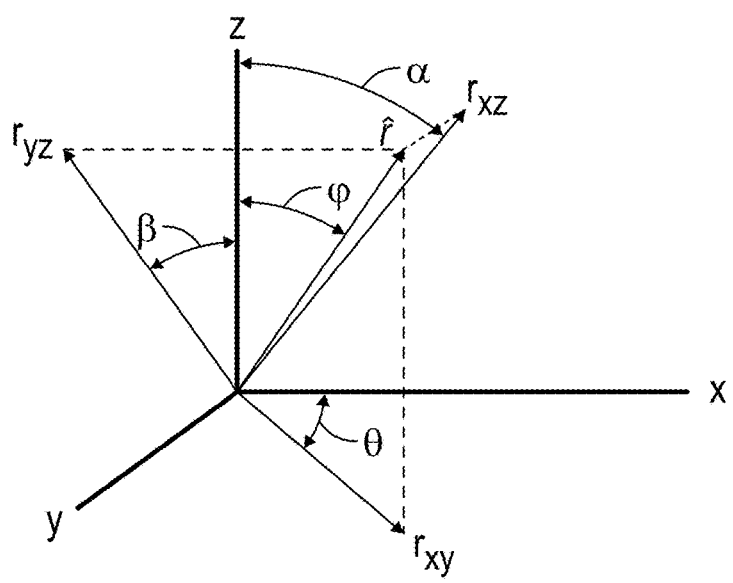
FIG. 3 illustrates the angles of Table 1 for an arbitrary light ray.

FIG. 2 illustrates a light ray diagram 200 indicating a direction of light ray propagation from each of the LEDs of the light assembly. The central light ray from each light source is shown. In particular, the first camera 20 is located at an x-positon of −0.1 m, while the second camera 30 is located an x-position of +0.1 m. As can be seen from the light ray diagram 200, each ray is divergent from the central location of their associated cameras as the light extends in the positive z-direction. In other words, light from LEDS 1-4 diverge from the first camera location in the positive z-direction and light from LEDS 5-8 diverge from the second camera location in the positive z-direction. Table 1 provides information on the angular orientation of each of the light rays. FIG. 3 illustrates the angles of Table 1 for an arbitrary light ray.

TABLE 1

| | | Zenith to z-axis ($\varphi$) | Azimuth in x-y plane ($\theta$) | Angle to z-axis in x-z plane ($\alpha$) | Angle to z-axis in y-z plane ($\beta$) |
|---|---|---|---|---|---|
| 1 | Left | 25.5° | −70.6° | 9° | 24.3° |
| 2 | LED | 25.5° | 70.6° | 9° | 24.3° |
| 3 | ring | 30.3° | 126.2° | 19° | 25.2° |
| 4 | | 30.3° | −126.2° | 19° | 25.2° |
| 5 | Right | 30.3° | 53.8° | 19° | 25.2° |
| 6 | LED | 25.5° | 109.4° | 9° | 24.3° |
| 7 | ring | 25.5° | −109.4° | 9° | 24.3° |
| 8 | | 30.3° | −53.8° | 19° | 25.2° |

Figure 4:
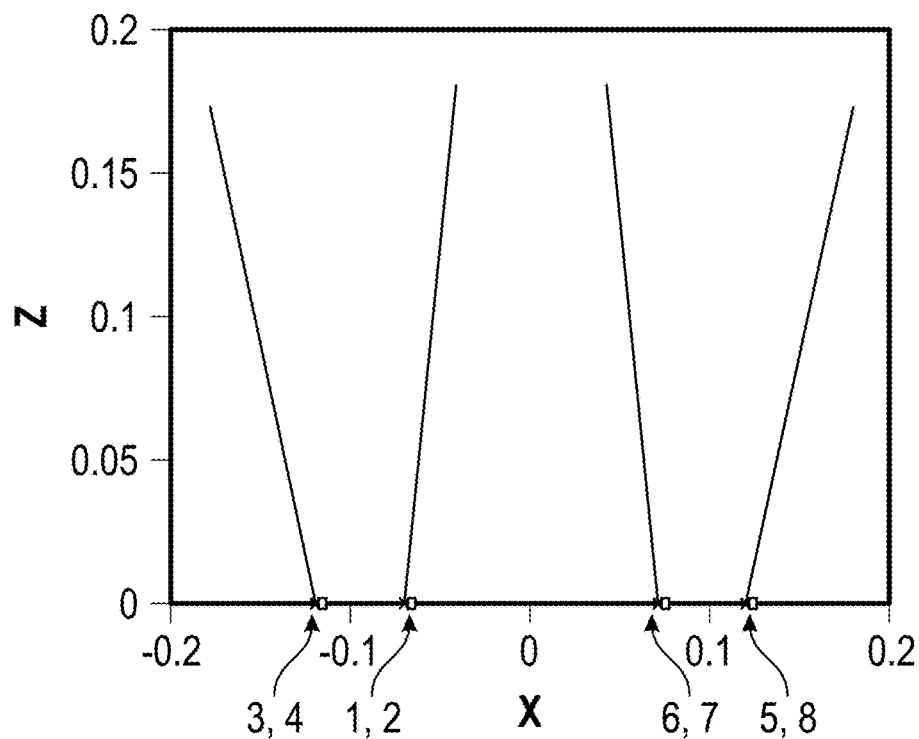
FIG. 4 shows a projection of the LED light rays of FIG. 2 onto the x-z-plane.
Figure 5:
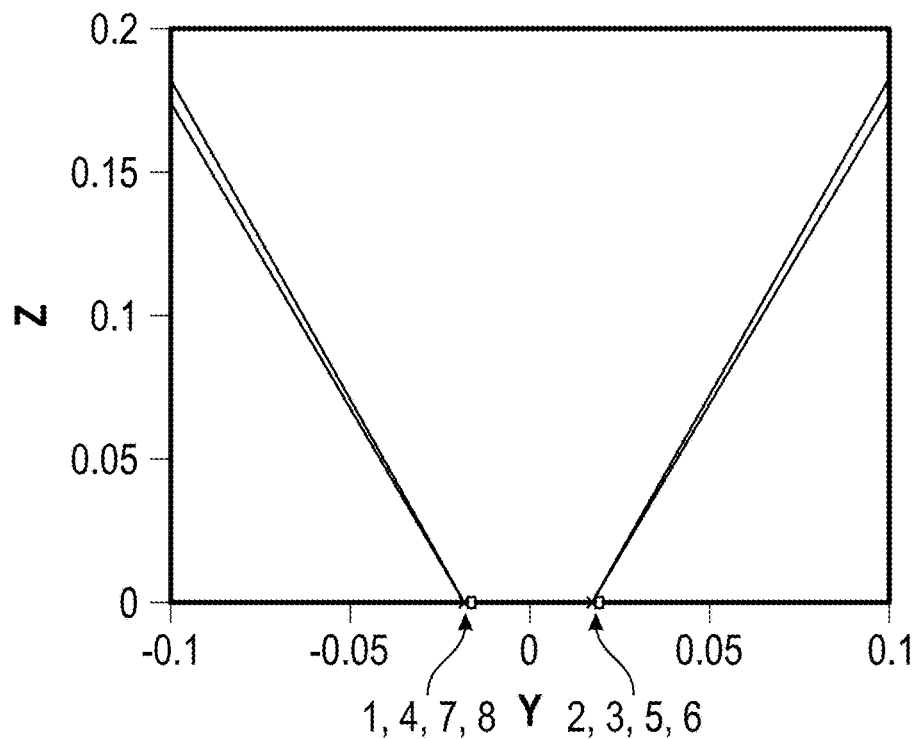
FIG. 5 shows a projection of the LED light rays of FIG. 2 onto the y-z-plane.

FIG. 4 shows a projection of the LED light rays of FIG. 2 onto the x-z-plane. These projections correspond to the second to last column in Table 1. FIG. 5 shows a projection of the LED light rays of FIG. 2 onto the y-z-plane. These projections correspond to the last column in Table 1.

FIGS. 6A and 6B shows calculated light distributions for a region in the positive z-direction for the imaging device 100. Both the first set 60 of light sources and the second set 70 of light sources are active with equal intensity. FIG. 6A shows a light distribution within an x-z plane with the origin at a midpoint of the baseline between the first camera 20 and the second camera 30. The lines 602 and 604 indicate the edges of the field of view of the imaging device 100. FIG. 6B shows a light distribution within a y-z having the same origin as in FIG. 6A. The lines 606 and 608 indicate the edges of the field of view of the imaging device.

Figure 7A:
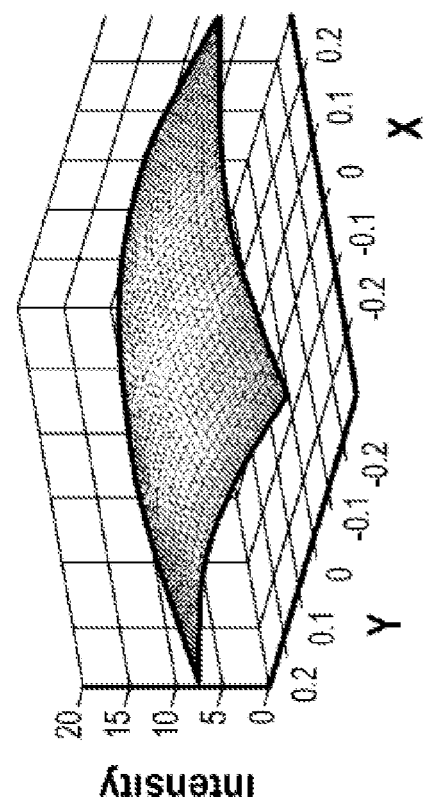
FIGS. 7A-7D show a calculated intensity distribution in x-y planes at various distances along the z-axis from the imaging device.
Figure 7B:
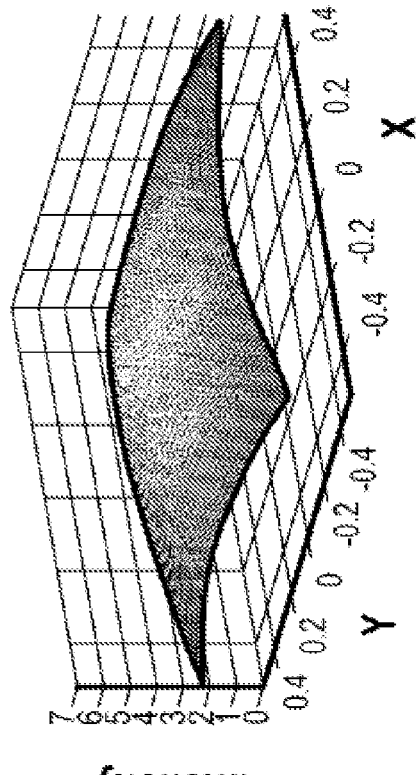
Figure 7C:
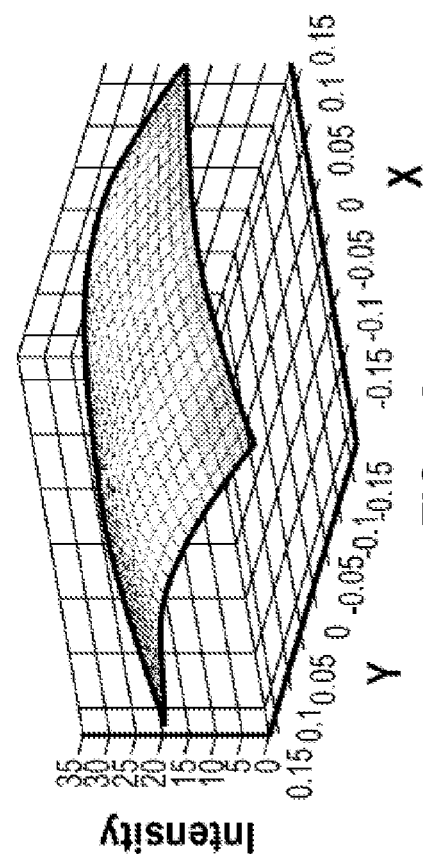
Figure 7D:
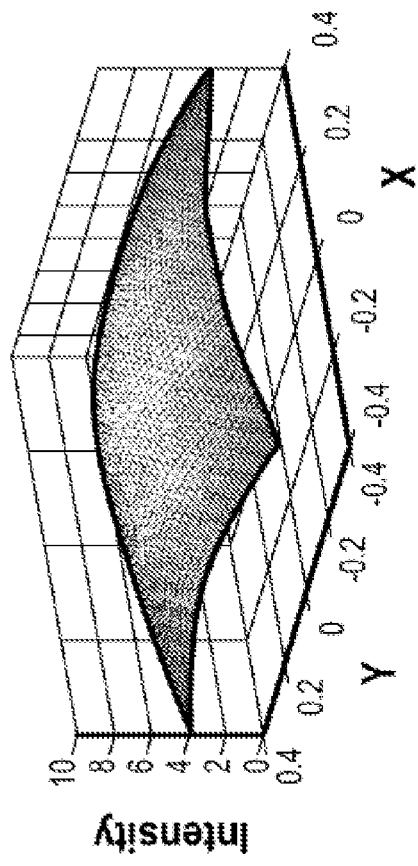

FIGS. 7A-7D show a calculated intensity distribution in x-y planes at various distances along the z-axis from the imaging device. Both the first set 60 of light sources and the second set 70 of light sources are active with equal intensity. FIG. 7A shows the intensity distribution at a distance of +0.3 meters along the z-axis. The average intensity distribution is about 20 units (units are arbitrary light power units) at this distance. FIG. 7B shows the intensity distribution at a distance of +0.5 meters along the z-axis. The average intensity distribution is about 10 units at this distance. FIG. 7C shows the intensity distribution at a distance of +0.7 meters along the z-axis. The average intensity distribution is about 4 units at this distance. FIG. 7D shows the intensity distribution at a distance of +0.9 meters along the z-axis. The average intensity distribution is about 3 units at this distance.

It should be appreciated that the distribution of the light intensity is substantially uniform across the field of view due to the angular orientation of the LEDS. It should further be appreciated that this provides advantages in avoiding spots of substantially higher intensity in overlapping areas of the two sets of LEDS within the field of view.

FIGS. 8A and 8B show calculated light distribution where only the left set of light sources is active. In FIG. 8A, the calculated light distribution is shown along the x-z plane (at y=0). The straight lines 802 and 804 indicate the edges of the field of view of the imaging device within the x-z plane. In FIG. 8B, the calculated light distribution is shown along the y-z plane (at x=0). The straight lines 806 and 808 indicate the edges of the field of view of the imaging device within the y-z plane.

It should be appreciated that the distribution of the light intensity covers the full field of view in the x- and y-directions. Retro reflecting targets will therefore return light into the camera independent of their position within the field of view.

Figures 9A, 9B:
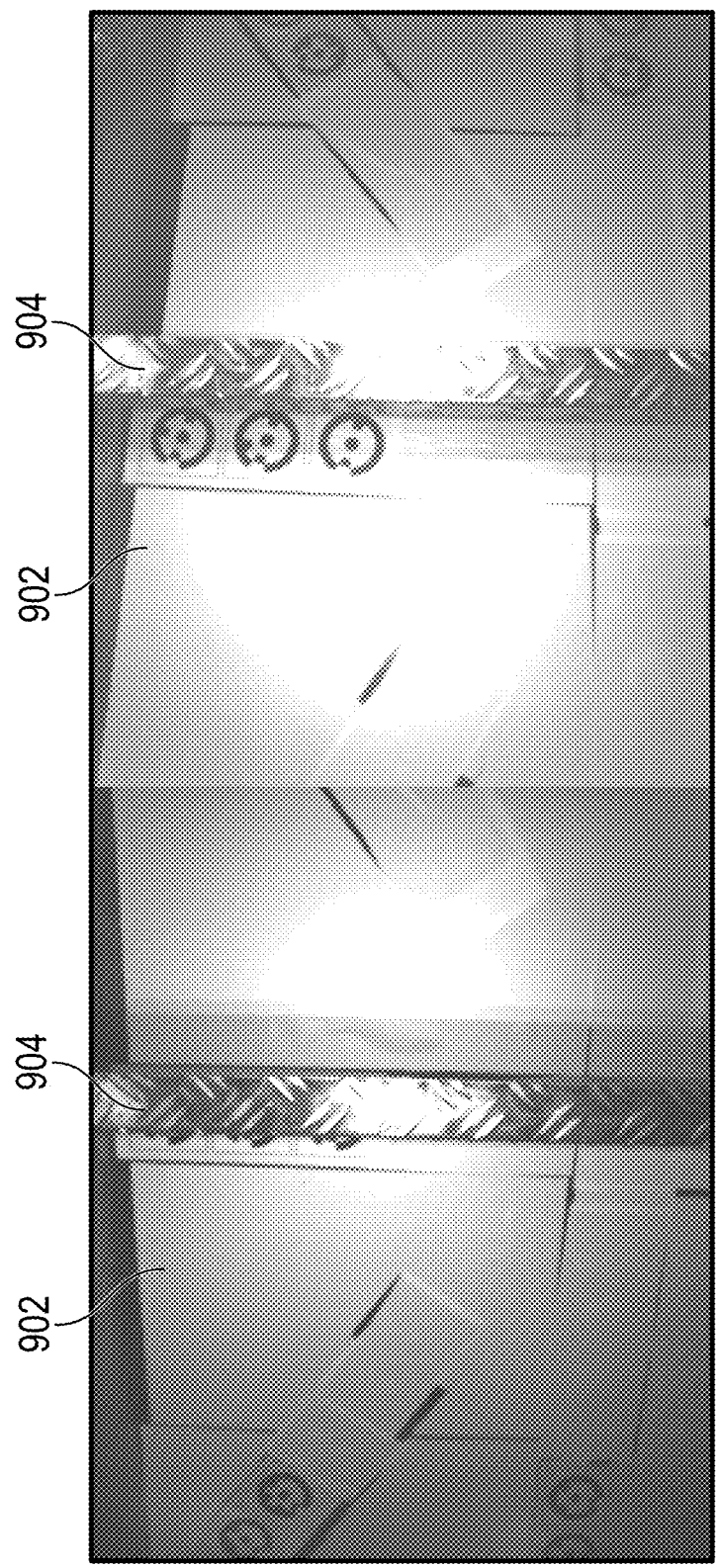
FIGS. 9A and 9B show images of a background scenery that is used for illumination testing taken from the left camera of the imaging device and the right camera of the imaging device, respectively.

FIGS. 9A and 9B shows two images of a scenery or background that is used for illumination testing. FIG. 9A is an image taken of the scenery from the left camera of the imaging device 100, while FIG. 9B is an image taken of the scenery from the right camera. The scenery includes a wall 902 of material providing diffuse reflection and a post 904 made of a highly reflective material. The scenery is shown illuminated by a stereo light, in which both the first set 60 of light sources and the second set 70 of light sources are illuminated. As oriented to image the scenery, the first camera 30 of the imaging device 100 is on the right side of the image from the vantage point of a person standing behind the imaging device 100, and the second camera 40 is on the left side of the image. A direct reflection is clearly visible from the metal post 904 in each image.

FIGS. 10A and 10B show the same scenery as in FIGS. 9A and 9B with illumination only by the second set 70 of light sources. FIG. 10A shows the scenery taken from the left camera while FIG. 10B shows the scenery taken from the right camera. As a result of the illumination by the second set 70 of light sources, direct reflection from the post 904 is visible only in the first (right-side) camera (FIG. 10B). FIGS. 11A and 11B shows the same scenery as in FIGS. 9A and 9B with illumination only by the first set 60 of light sources. FIG. 11A shows the scenery taken from the left camera while FIG. 11B shows the scenery taken from the right camera. As a result of the illumination by the first set 60 of light sources, direct reflection 1102 from the post 904 is visible only in the second (left-side) camera (FIG. 11A).

FIGS. 12A and 12B show the combination of the images of FIGS. 10A and 10B and FIGS. 11A and 11B to remove reflections and/or shadows. In order to remove reflections or shadows (or to enhance other features), a plurality of stereo images are recorded, i.e. images from both cameras, where each exposure has a different light setting. For any particular exposure, any one of the two light sources is turned on. This setting can involve one or more LEDs or LED sets at full power or with one of the LEDs r LED sets switched off completely. The setting can also involve an unbalanced illumination where one or more of the LED-rings are set to an intensity value between 0% and 100%. In various embodiments, two consecutive exposures can be used to remove unwanted reflections to a substantial degree, with each exposure having a different light setting. FIG. 12A for example shows the scenery from an exposure using the left camera with glare removed and FIG. 12B shows the scenery from an exposure using the right camera with the glare removed. In this example, the combined images (FIGS. 12A and 12B) is made by comparing two exposures from a single camera in different lighting, on a pixel by pixel basis, with the pixel having the minimum value being selected for the resulting image.

Figures 13A, 13B:
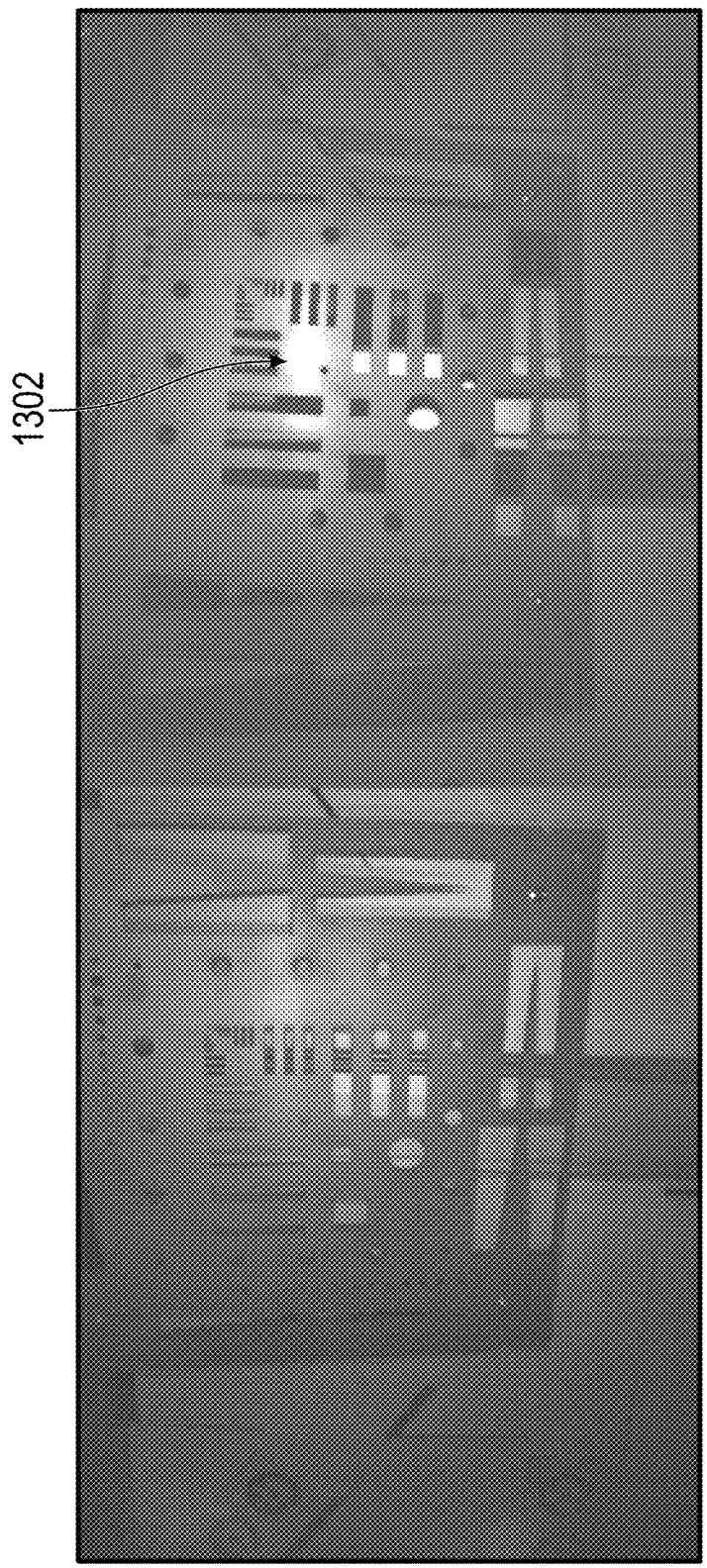
FIGS. 13A and 13B show reflections from a test board placed against the background of FIGS. 9A and 9B.

FIGS. 13A and 13B show reflections from a test board placed against the background of FIGS. 9A and 9B. In FIGS. 13A and 13B, the illumination is provided by the second set of light sources, providing illumination from the left side. FIG. 13A shows an image of the test board captured at the second (left) camera. FIG. 13B shows an image of the test board captured at the first (right) camera. A scratch 1302 can be seen in the center of the board in FIG. 13B.

FIGS. 14A and 14B show processed images for left and right cameras, respectively. The image of FIG. 14A results from subtracting the image captured at the left camera using mono left-sided illumination of the region from an image captured at the left camera using mono right-sided illumination of the region (not shown). The resulting image of FIG. 14A highlights the scratch in the test board. The image of FIG. 14B results from subtracting the image captured at the right camera using mono left-sided illumination of the region from an image captured at the right camera using mono right-sided illumination of the region (not shown). The resulting image of FIG. 13A shows the test board without noticeably displaying the scratch. As FIGS. 13A and 13B show, embodiments that allow for independent activation of the light sources associated with the cameras 20, 30 provides advantages in allowing features (e.g. scratch 1302) that would otherwise not be detected in the images acquired by the cameras 20, 30.

In various embodiments, the imaging device 100 can be used to image retroreflective targets. Retroreflective targets are useful for accurate registration of point or localization. Additionally, retroreflective targets provide a good signal-to-background-ratio. Effective retro reflection generally requires a small separation between the camera and the light sources. In various embodiments, a first image of the retroreflector can be taken using a mono-illumination from light sources associated with one camera and a second image can be taken using mono-illumination from light sources associated with another camera. The images can be subtracted in order to improve target-background light ratio.

Accurate localization of retroreflective targets can requires symmetric arrangement and alignment of the light sources around the camera. This conflicts with the requirement of homogeneous illumination of the camera field of view. Using the present invention, both requirements can be met by using two sets of light sources both optimized to the two opposing requirements. In one embodiment, the first and second light sources can be arranged and aligned symmetrically around their respective cameras. The first and second light sources then together form a homogeneous illumination of a field of view of at least one of the first camera and the second camera. A third light source can be located in a periphery of the first camera and a fourth light source can be located in a periphery of the second camera. While the first and second light sources are used to generate a homogeneous light field, the third and fourth light sources can be used to form an illumination that is symmetric around their respective cameras.

Figure 15B:
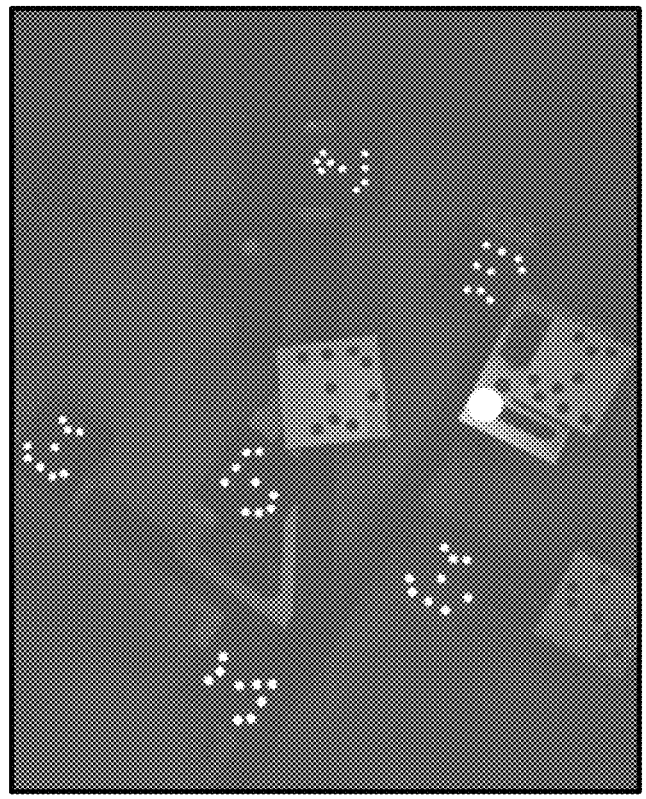
FIGS. 15A and 15B show a stereo reflection of the retroreflectors at a distance of 0.4 meters from the imaging assembly.
Figure 15A:
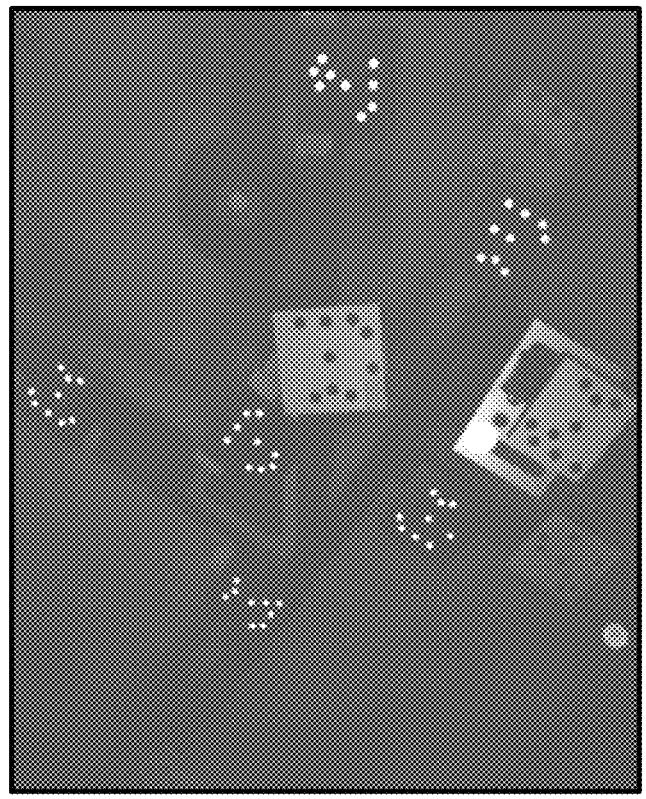
Figure 16B:
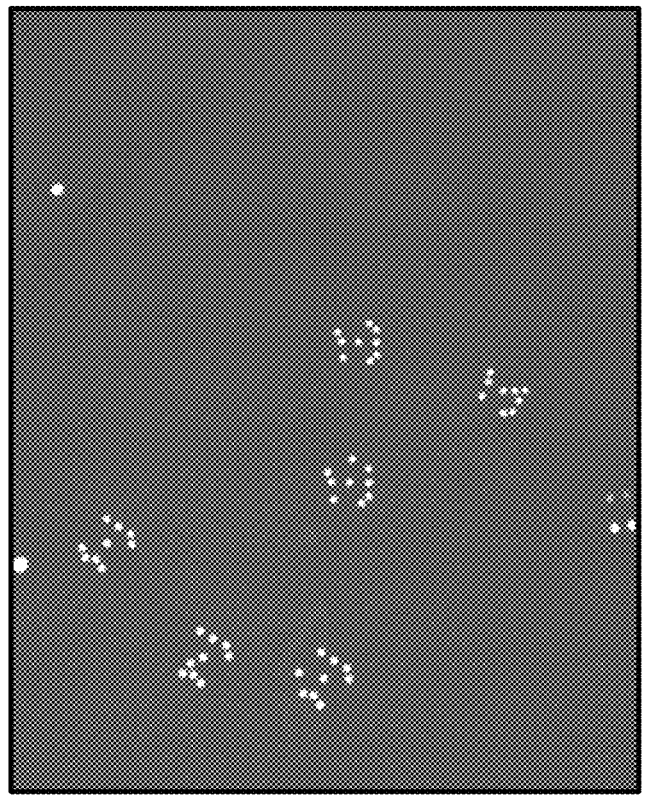
FIGS. 16A and 16B show a stereo reflection of the retroreflectors at a distance of 1.5 meters from the imaging assembly.
Figure 16A:
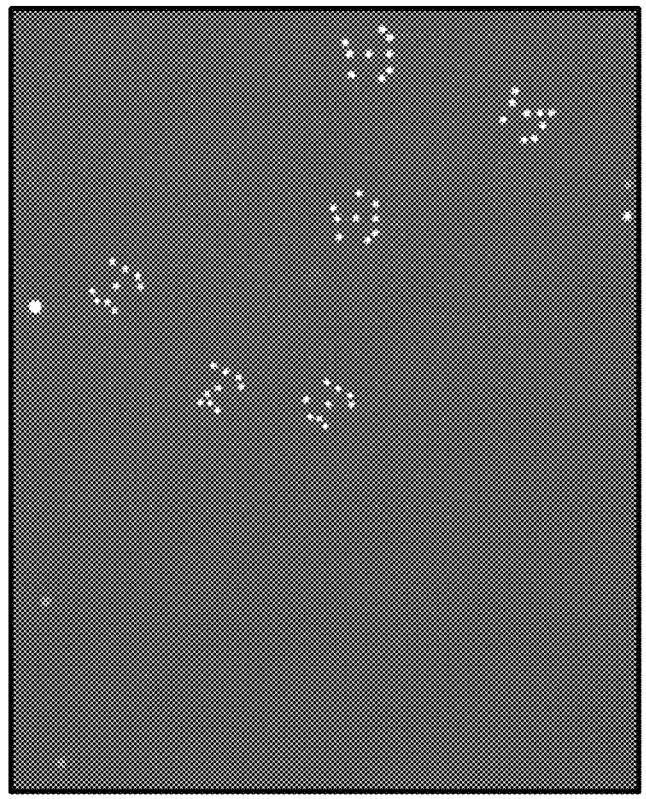
Figure 17B:
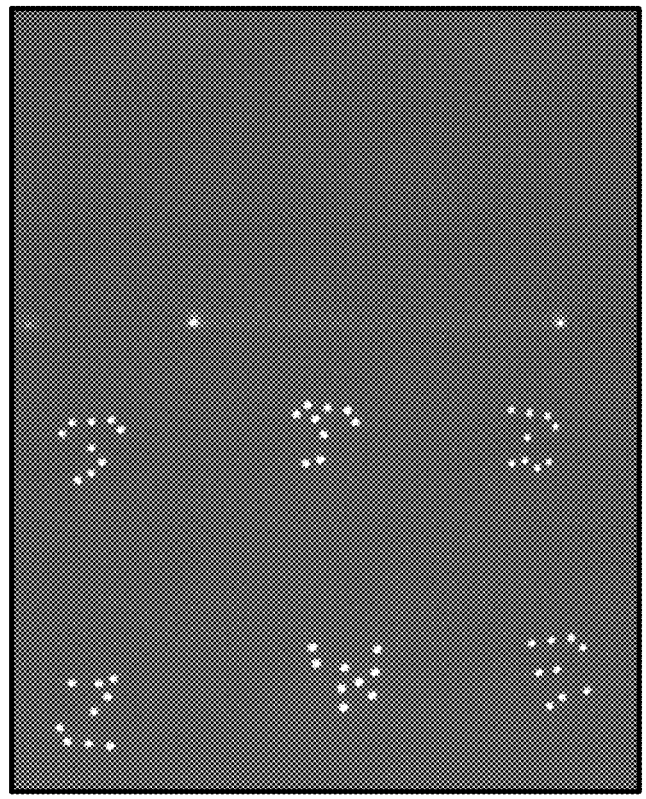
FIGS. 17A and 17B show a stereo reflection of the retroreflectors at a distance of 2.7 meters from the imaging assembly.
Figure 17A:
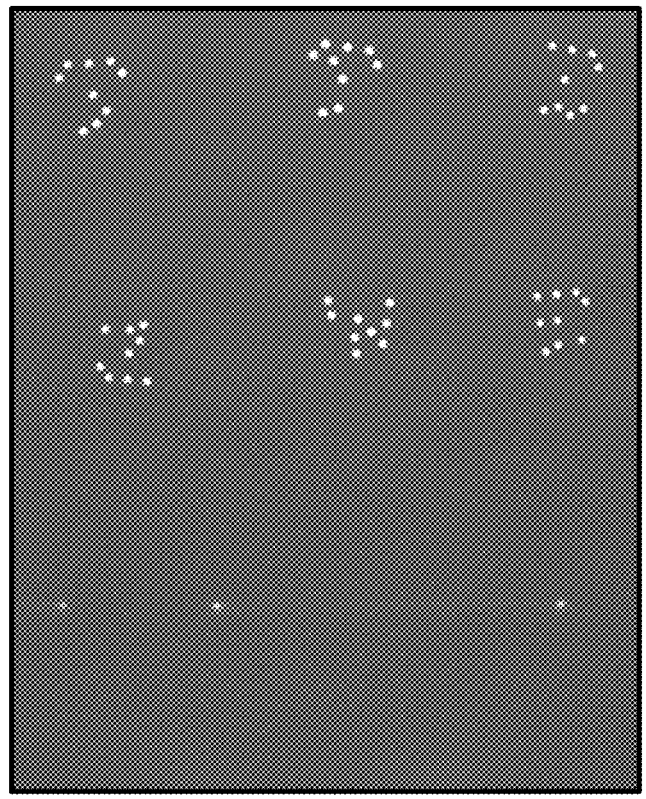

FIGS. 15A and 15B show a stereo reflection of the retroreflectors at a distance of 0.4 meters from the imaging assembly. FIGS. 16A and 16B show a stereo reflection of the retroreflectors at a distance of 1.5 meters from the imaging assembly. FIGS. 17A and 17B show a stereo reflection of the retroreflectors at a distance of 2.7 meters from the imaging assembly.

In various embodiments, information about a normal vector to the surface for at least a portion of a surface of an object in at least the first image and the second image can be calculated at the processor 52. In addition, information about a three-dimensional position of the surface for at least a portion of the surface of the object can be calculated at the processor.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed is:

1. An imaging device, comprising:
a first camera having a first optical axis;
a first light source for illuminating a region, the first light source set including four light sources at a front surface of the imaging device located along a first ring that is concentric with the first optical axis, wherein each of the four light sources is oriented such that a central light ray exiting a light source diverges at an angle from the first optical axis;
a second camera separated from the first camera by a selected distance, the second camera having a second optical axis, wherein at least one of the four light sources of the first light source are located between the first camera and the second camera;
a light barrier projecting from the front surface located between the first camera and the second camera and between the first camera and the at least one of the four light sources;
a second light source set at a periphery of the second camera for illuminating the region, the second light source set including four light sources at the front surface located along a second ring that is concentric with the second optical axis, wherein each of the four light sources is oriented such that a central light ray exiting a light source diverges at an angle from the second optical axis; and
a processor configured to operate the first light source set and the second light source set independently of each other to illuminate the region.

2. The imaging device of claim 1, wherein the light sources of the first light source set and the second light source set are arranged and aligned symmetrically around their respective cameras and the light sources of the first light source set and the second light source set together form a homogeneous illumination of a field of view of at least one of the first camera and the second camera.

3. The imaging device of claim 1, wherein a third light source set is located in a in periphery of the first camera and a fourth light source set is located in a periphery of the second camera, the first light source set and second light source set being used to generate a homogeneous light field, and the third light source set and fourth light source set being used to form an illumination that is symmetric around their respective cameras.

4. The imaging device of claim 1, wherein the processor is further configured to operate the first light source set and the second light source set independently in order to suppress or highlight illumination effects in at least one of the first camera and the second camera.

5. The imaging device of claim 1, wherein the processor is configured to control an illumination level of each light source set independently.

6. The imaging device of claim 1, wherein the four light sources of the first light source set are located in separate quadrants of the first camera.

7. The imaging device of claim 1, wherein the four light sources of at least one of the first light source set and the second light source set are non-planar and non-axisymmetric.

8. The imaging device of claim 1, wherein each light source of at least one of the first light source set and the second light source set are oriented to project light along a principle ray at a non-zero angle with respect to a z-axis of the imaging device.

9. A method of imaging a region, comprising:
illuminating the region using a first light source set associated with a first camera of an imaging device, the first light source set including four light sources at a front surface of the imaging device located along a first ring that is concentric with a first optical axis of the first camera, wherein each of the four light sources is oriented such that a central light ray exiting the light source diverges at an angle from the first optical axis;
obtaining a first image;
illuminating the region using a second light source set associated with a second camera of the imaging device, the second light source set including four light sources at the front surface located along a second ring that is concentric with the second optical axis, wherein each of the four light sources is oriented such that a light ray exiting from the light source diverges at an angle from the second optical axis, wherein at least one of the four light sources of the first light source is located between the first camera and the second camera and a light barrier projecting from the front surface is located between the first camera and the second camera and blocks light from the at least one of the four light sources from directly entering the first camera; and
obtaining a second image, wherein at least one of the first image and the second image includes an illumination effect.

10. The method of claim 9, further comprising combining, via a processor, the first image and the second image to form a combined image with an enhanced or reduced illumination effect.

11. The method of claim 9, wherein the illumination effect is at least one of: (i) a specular reflection; (ii) a diffuse reflection; and (iii) a shadow.

12. The method of claim 9, further operating the first light source set and the second light source set independently in order to obtain at least one of (i) a homogenous illumination in the region; and (ii) an illumination that is symmetric about one of the first camera and the second camera.

13. The method of claim 9, further comprising independently controlling illumination level of each light source set.

14. The method of claim 9, wherein the light sources of at least one of the first light source set and the second light source set are non-planar and non-axisymmetric.

15. The method of claim 9, further comprising projecting light from each light source of the first set and second set along a principle ray at a non-zero angle with respect to a z-axis of the imaging device.

16. The method of claim 9, further comprising calculating, via a processor, information about a normal vector to the surface for at least a portion of a surface of an object in at least the first image and the second image.

17. The method of claim 16, further comprising calculating, via a processor, information about a three-dimensional position of the surface for at least a portion of the surface of the object.

* * * * *